US009672960B2

(12) United States Patent
Inao et al.

(10) Patent No.: US 9,672,960 B2

(45) Date of Patent: Jun. 6, 2017

(54) EXTERIOR MEMBER AND ELECTRIC WIRE WIRING STRUCTURE

(71) Applicant: Yazaki Corporation, Tokyo (JP)

(72) Inventors: Shinichi Inao, Makinohara (JP); Hideomi Adachi, Makinohara (JP); Takeshi Ogue, Makinohara (JP); Tatsuya Oga, Makinohara (JP); Masaaki Suguro, Makinohara (JP); Yoshiaki Ozaki, Makinohara (JP); Hiroyuki Yoshida, Makinohara (JP)

(73) Assignee: Yazaki Corporation, Tokyo (JP)

( * ) Notice: Subject to any disclaimer, the term of this patent is extended or adjusted under 35 U.S.C. 154(b) by 178 days.

(21) Appl. No.: 14/635,089

(22) Filed: Mar. 2, 2015

(65) Prior Publication Data

US 2015/0175097 A1 Jun. 25, 2015

Related U.S. Application Data

(63) Continuation of application No. PCT/JP2013/073443, filed on Aug. 30, 2013.

(30) Foreign Application Priority Data

Sep. 3, 2012 (JP) ................................ 2012-192884

(51) Int. Cl.

*H01B 7/00* (2006.01)
*H02G 3/04* (2006.01)

(Continued)

(52) U.S. Cl.

CPC ......... *H01B 13/34* (2013.01); *B60R 16/0215* (2013.01); *H01B 7/17* (2013.01);

(Continued)

(58) Field of Classification Search

CPC . B60R 16/02; B60R 16/0207; B60R 16/0215; F16L 57/00; H01B 7/00;

(Continued)

(56) References Cited

U.S. PATENT DOCUMENTS 5,911,450 A * 6/1999 Shibata ............... B60R 16/0207 174/112
2011/0088944 A1* 4/2011 Ogue .................. B60R 16/0215 174/72 A (Continued)

FOREIGN PATENT DOCUMENTS

CN 102055122 A 5/2011
CN 102136706 A 7/2011

(Continued)

OTHER PUBLICATIONS

Office Action issued on Jul. 26, 2016, by the Japanese Patent Office in counterpart Japanese Application No. 2012-192884.

(Continued)

*Primary Examiner* — Timothy Thompson
*Assistant Examiner* — Guillermo Egoavil
(74) *Attorney, Agent, or Firm* — Sughrue Mion, PLLC

(57) ABSTRACT

An exterior member which covers the circumference of an electric wire, which is wired between electrical components, along the electric wire, and is supported by a supporting body while one side in a circumferential direction is exposed, includes an exterior member body that is formed into a long cylindrical shape and which has a predetermined background color, and an identifying mark that is provided on the outer surface of the exterior member body and which has another predetermined color different from the background color. The exterior member body is formed with at least one bent part which is bent at a middle position in a longitudinal direction, and the identifying mark is provided (Continued)

to face the one side while the exterior member is supported by the supporting body.

5 Claims, 5 Drawing Sheets

(51) Int. Cl.
*E04B 1/00* (2006.01)
*H01B 13/34* (2006.01)
*B60R 16/02* (2006.01)
*H01B 7/17* (2006.01)
*H01B 7/36* (2006.01)

(52) U.S. Cl.
CPC ............ *H01B 7/36* (2013.01); *H02G 3/0481* (2013.01); *H02G 2200/20* (2013.01); *Y10T 29/49227* (2015.01)

(58) Field of Classification Search
CPC . H01B 7/17; H01B 7/36; H01B 13/34; H02G 2200/20; H02G 3/04; H02G 3/0481; Y10T 29/49227; Y10T 29/49769
USPC .......... 29/407.04; 52/105; 156/86; 174/72 A, 174/88 R, 93, 107, DIG. 8, 112; 285/381.5, 915; 405/259.5, 262; 439/932
See application file for complete search history.

(56) References Cited

U.S. PATENT DOCUMENTS

| | | | |
|---|---|---|---|
| 2011/0094796 | A1 | 4/2011 | Toyama et al. |
| 2011/0155458 | A1 | 6/2011 | Kato et al. |
| 2013/0008711 | A1 | 1/2013 | Toyama et al. |
| 2013/0248246 | A1 | 9/2013 | Oga |

FOREIGN PATENT DOCUMENTS

| | | | | |
|---|---|---|---|---|
| DE | 29611830 | U1 | | 9/1996 |
| JP | 2003-168329 | A | | 6/2003 |
| JP | 2003168329 | A | * | 6/2003 |
| JP | 2009-143326 | A | | 7/2009 |
| JP | 2009-303467 | A | | 12/2009 |
| JP | 2009303467 | A | * | 12/2009 |
| JP | 2011-193677 | A | | 9/2011 |
| JP | 2012-125097 | A | | 6/2012 |
| WO | 2012/077826 | A1 | | 6/2012 |

OTHER PUBLICATIONS

Search Report dated Oct. 22, 2013, issued by the International Searching Authority in counterpart International Application No. PCT/JP2013/073443.

Written Opinion dated Oct. 22, 2013, issued by the International Searching Authority in counterpart International Application No. PCT/JP2013/073443.

Communication issued Mar. 24, 2016, issued by the European Patent Office in counterpart European Patent Application No. 13833130.1.

Written Opinion for PCT/JP2013/073443 dated Oct. 22, 2013 [PCT/ISA/237].

Communication issued Jun. 24, 2016, issued by the State Intellectual Property Office of the People's Republic of China in counterpart Chinese Patent Application No. 201380045797.0.

Office Action dated Jan. 22, 2017 issued by the State Intellectual Property Office of the People's Republic of China in counterpart Chinese Patent Application No. 201380045797.0.

Communication dated Jan. 10, 2017, from the Japanese Patent Office in counterpart application No. 2012-192884.

* cited by examiner

EXTERIOR MEMBER AND ELECTRIC WIRE WIRING STRUCTURE

CROSS REFERENCE TO RELATED APPLICATIONS

This application is a continuation of PCT application No. PCT/JP2013/073443, which was filed on Aug. 30, 2013 based on Japanese Patent Application (No. 2012-192884) filed on Sep. 3, 2012, the contents of which are incorporated herein by reference.

BACKGROUND OF THE INVENTION

1. Field of the Invention

The present invention relates to an exterior member, an electric wire wiring structure, and a method of manufacturing the exterior member, and more specifically, to an exterior member which covers the circumference of an electric wire along the electric wire which is wired between electrical components, an electric wire wiring structure which includes the exterior member, and a method of manufacturing the exterior member.

2. Related Art

In an automobile, various electrical components or electronic devices are loaded, and electric wires (in other words, wire harnesses) are wired in order to transmit electric power, control signals or the like between the electrical components (electronic devices). It is proposed that identifying marks are given to the various electric wires to identify which electrical circuit each of the electric wires corresponds to (refer to a JP-A-2003-168329). A coated electric wire described in the JP-A-2003-168329 is given a plurality of kinds of identifying marks, which are intermittent in an axial direction (that is, longitudinal direction) of the outer surface of a coated part and which are different from each other in color and size, by printing.

Especially in an electric vehicle or a hybrid vehicle among automobiles, equipments such as a motor, a battery, and an inverter are electrically connected by electric wires which are electric power wires. Therefore, while a DC power from the battery is transmitted to the inverter by the electric wires, an AC power converted by the inverter is supplied to the motor, and the motor is driven by the supplied electric power. In this way, the electric power supplied to the motor is a high voltage one, and in order to identify a high voltage electric wire, the whole of an insulative coating of the electric wire (namely sheath) or an exterior member (for example, a corrugated tube, an aluminum pipe or the like) is colored to have a predetermined identifying color (such as orange) (refer to a JP-A-2009-143326).

On the other hand, in an electric vehicle or a hybrid vehicle, the battery is installed under a seat or in a trunk room at the rear side of the vehicle, and the inverter and the motor are arranged in the engine room at the front side of the vehicle. In this case, the electric wires (that is, electric power wires) which connect the battery with the inverter are wired under the floor of the vehicle (refer to a JP-A-2012-125097). In this way, the electric wire that is wired under the floor is typically covered by an exterior member in order to protect the electric wire from stone splash or water splash when the vehicle is running. In addition, in order to prevent electrical noise from leaking from the wired electric wire, and in order to prevent outside electrical noise from entering into the electric wire, the electric wire is shielded by being covered by a conductive exterior member.

Thus, the exterior member is required to have not only functions of, for example, protecting the electric wire, waterproofing and electrically shielding, but also various performances, such as maintaining a three-dimensional wiring shape, and improving stability while the electric wire is transported and operativity while being assembled to the vehicle.

SUMMARY OF THE INVENTION

Because the material, manufacturing method or the like of the exterior member, which is required to have the above various performances, are properly selected, the following inconveniences relating to identifying the exterior member from other electric wires (or other exterior members) with the identifying color are generated. Firstly, as described in the JP-A-2003-168329, when the plurality of kinds of identifying marks which are different from each other in color and size are intermittently given in a longitudinal direction of the long exterior member, it is possible that the process of coloring the plurality of colors becomes complex, the coloring device is upsized, and manufacturing cost is increased. In addition, when the electric wire is wired under the vehicle floor or the like, although the exterior member is bent to have a shape corresponding to the shape of the floor, the identifying mark moves to a position where the identifying mark is difficult to be visually recognized, for example, the floor side, because of the bending, and it may become hard to identify. Secondly, as described in the JP-A-2009-143326, when the exterior member is integrally molded of resin in which color agent is mixed, the manufacturing process can be simplified. However, because an exterior member made of metal cannot be adopted, and it is necessary to change the manufacturing process according to the material of the exterior member, the process becomes inefficient. In addition, when the whole outer surface of the metal exterior member is colored to have an identifying color, there is a problem which is that material cost is high because a large amount of color agent is used.

Therefore, the object of the present invention is to provide an exterior member, an electric wire wiring structure, and a method of manufacturing the exterior member so that while the manufacturing cost can be controlled even for exterior members made of various materials, and an identifying mark whose identifying property is high is included.

In order to solve the above problem, the coated electric wire attached connector of the present invention includes following features (1) to (3).

(1) An exterior member which covers the circumference of an electric wire, which is wired between electrical components, along the electric wire, and is supported by a supporting body while one side in a circumferential direction is exposed, includes an exterior member body that is formed into a long cylindrical shape and which has a predetermined background color, and an identifying mark that is provided on the outer surface of the exterior member body and which has another predetermined color different from the background color. The exterior member body is formed with at least one bent part which is bent at a middle position in a longitudinal direction, and the identifying mark is provided to face the one side while the exterior member is supported by the supporting body.

(2) An electric wire wiring structure includes an electric wire that is wired in the longitudinal direction of a vehicle under a floor of the vehicle, and the exterior member according to claim 1 that covers the circumference of the electric wire. The exterior member is supported by the floor of the vehicle and is exposed downward, and the identifying mark is provided to face a lower side while the exterior member is supported by the floor of the vehicle.

(3) A method of manufacturing the exterior member described in the above (1), after the identifying mark is provided on the outer surface of the exterior member body having a straight shape, the exterior member body is bent at a middle position in the longitudinal direction.

According to the exterior member as described in the above (1), because the identifying mark is provided to have a predetermined color which is different from the background color of the exterior member body, the identifying mark can be given by being colored (for example, colored by being painted or tape-attached) on the outer surface of the exterior member body regardless of the material of the exterior member body. In addition, the identifying mark is provided to face the one side (namely, exposed side) while the exterior member is supported by the supporting body. Thus, even if the exterior member body has the bent part, the identifying mark can be visually recognized from the one side. In this way, because visibility is ensured, identifying property of the exterior member can be improved by the identifying color of the identifying mark. Furthermore, because the visibility can be ensured when the identifying mark is provided at the one side, it is not necessary to provide an identifying mark at the other side (that is, supporting body side). Therefore, the amount of color agent (for example, paint or color tape) to form the identifying mark can be reduced, and the material cost can be suppressed.

Herein, for example, a plurality of linear marks can be used as the identifying mark. When the exterior member supported by the supporting body is viewed from one side, if the plurality of linear marks are provided in parallel with each other, the identifying mark can be regularly visually recognized (in other words, the identifying mark is visually recognized because of the regularity). Therefore, the identifying property can be further improved. In this case, the linear marks may be respectively provided with an arbitrary angle relative to the longitudinal direction of the parts of the exterior member body, and also may be provided at an arbitrary position in the circumferential direction of the exterior member body. At the one side of the exterior member which is supported by the supporting body after the exterior member body is bent, the linear marks may be visually recognized to be parallel. In addition, the identifying mark is not limited to the striped linear marks which are visually recognized to be parallel with each other, but may be a dotted mark in which some predetermined-sized dots (for example, round or square) are arranged by a suitable interval, or may be something that is filled on the outer surface of the exterior member body at the one side of the exterior member.

According to the electric wire wiring structure described in the above (2), because the identifying mark is provided to face the lower side of the exterior member body while the exterior member is supported by the floor of the vehicle, the identifying property of the electric wire can be improved at the time of vehicle maintenance. In addition, for example, in an electric vehicle or a hybrid vehicle, when a high voltage electric wire which connects a battery provided at the rear of the vehicle with an inverter provided at the front of the vehicle is covered by the above exterior member, even if the exterior member is bent to have a three-dimensional shape corresponding to the shape of the bottom of the floor of the vehicle, it can be prevented that the identifying property is reduced because the identifying mark can be visually recognized from the lower side.

According to the method of manufacturing the exterior member described in the above (3), after the identifying mark is provided on the outer surface of the straight exterior member body, the exterior member whose identifying property is high as described above can be manufactured by being bent at middle positions in the longitudinal direction of the exterior member body. In addition, because the exterior member body of a straight shape is provided with the identifying mark, the coloring process (for example, coating process or tape attaching process) can be efficiently performed. Herein, the positions of the straight exterior member body where the identifying mark is provided may be set by calculating sites at one side of the exterior member body which is bent and has a three-dimensional shape, and assigning (namely reversely calculating) the calculated sites onto the straight exterior member body. In addition, it is also possible to calculate the inclination angle of each part of the exterior member body which has a three-dimensional shape, and provide the identifying mark at positions where the identifying mark is easily visually recognized according to the inclination angle.

DETAILED DESCRIPTION OF THE EXEMPLARY EMBODIMENTS

Figure 1:
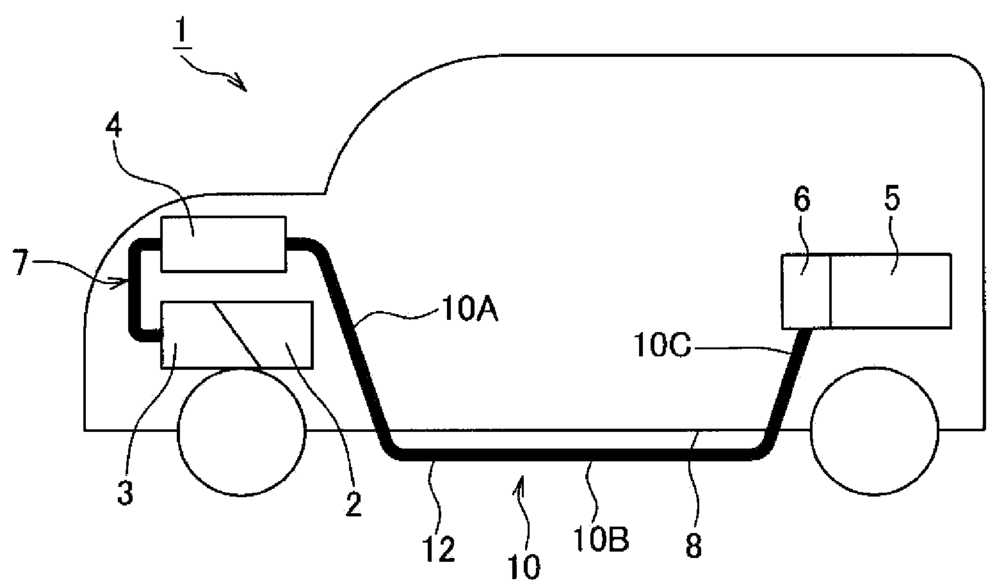
FIG. 1 is a figure which shows an automobile in which an electric wire wiring structure according to an embodiment is used.

An electric wire wiring structure and an exterior member 20 which is used in the electric wire wiring structure according to an embodiment of the present invention are described by using FIGS. 1 to 4B. In the embodiment, an automobile (namely, vehicle) 1, especially a hybrid vehicle which is driven with the driving force of both an engine and an electric motor, is illustrated, and an electric wire wiring structure 10, which the automobile 1 is provided with, is described. In addition, the automobile 1 is not limited to a hybrid vehicle, but also may be an electric vehicle which is driven by the driving power from an electric motor.

The automobile 1 includes an engine 2 and an electric motor 3 which are loaded in the engine room at the front of the automobile, an inverter 4 which is provided near the electric motor 3, a battery 5 which is loaded below the trunk room or a seat at the rear of the automobile, and a junction block 6 which is electrically connected to the battery 5. The electric wire wiring structure 10 electrically connects the junction block 6 with the inverter 4. High voltage DC electric power from the battery 5 is supplied to the inverter 4 through an electric wire 11 (refer to FIG. 3). That is, in the embodiment, the junction block 6 and the inverter 4 are illustrated as electrical components which are electrically connected by the electric wire 11. In addition, the electric motor 3 and the inverter 4 are electrically connected by a wire harness 7, and the electric power which is converted to three-phase AC electric power by the inverter 4 is supplied to the electric motor 3.

The electric wire wiring structure 10 includes a front part 10A which is electrically connected to the inverter 4 inside the engine room at the front of the vehicle, a middle part 10B which is led out to the lower side of the vehicle floor 8 from the engine room and extends in a vehicle longitudinal direction, and a rear part 10C which is led into the trunk room on the floor 8 at the rear side of the vehicle and electrically connected to the junction block 6. The electric wire wiring structure 10, as shown in FIG. 3, includes the electric wire 11 (which has two core wires 11A, insulative coatings 11B, and a sheath 11C), an exterior member 12 which covers the circumference of the electric wire 11 along the electric wire 11, and a plurality of brackets 13 (refer to FIG. 2) to fix the exterior member 12 to the floor 8 of the vehicle or the like (namely, supporting body).

The electric wire 11 which is a shielded electric wire for high voltage current transmission has a shielding material such as a web (not shown), and electrically connects the junction block 6 with the inverter 4 through shielded connectors which are not shown at the front part and the rear part respectively. In addition, the electric wire 11 is not limited to a shielded electric wire. When the exterior member 12 has a shielding function, it is possible to use a regular electric wire which does not have the shielding material.

Figure 2:
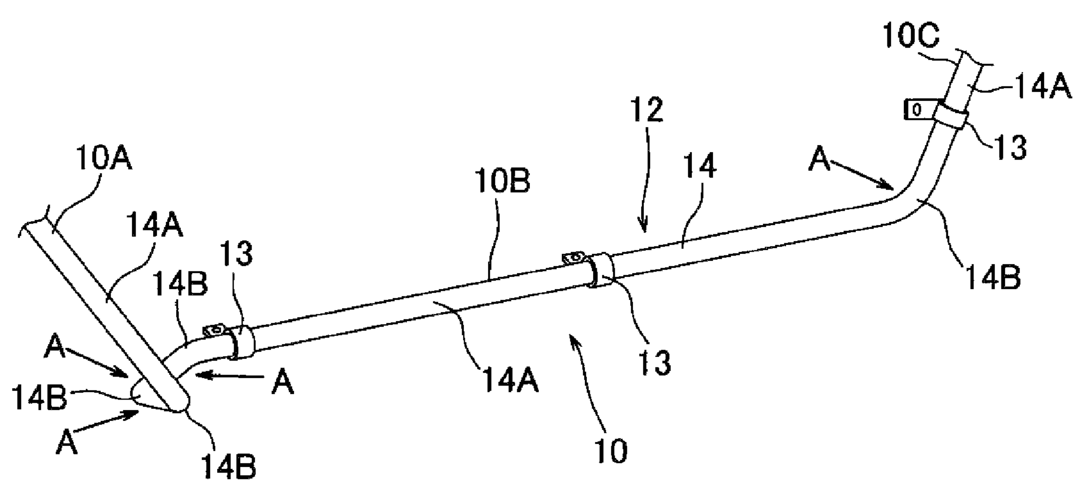
FIG. 2 is a perspective view which shows an exterior member of the electric wire wiring structure.
Figure 3:
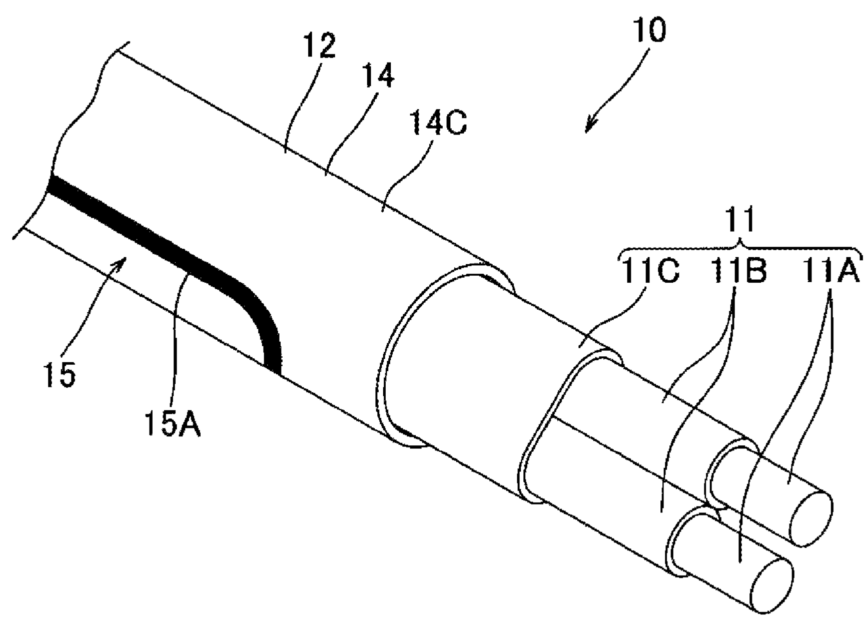
FIG. 3 is a perspective view which shows a section of one part of the electric wire wiring structure.

The exterior member 12 has an exterior member body 14 which is integrally formed to be a long pipe made of metal such as aluminum alloy, a long pipe made of hard heat-resistant resin or the like, and as shown in FIG. 2, is bent at a plurality of positions (positions indicated by symbols A in FIG. 2) along the longitudinal direction. That is, because the middle part 10B of the electric wire wiring structure 10 is provided along the lower side of the vehicle floor 8, the exterior member 12 is bent to have a three-dimensional shape corresponding to the wiring pathway and the shape of the floor 8. Furthermore, the exterior member 12 is bent upward from the middle part 10B of the electric wire wiring structure 10 toward the front part 10A and the rear part 10C respectively. In this way, the exterior member body 14 is formed to have a plurality of straight parts 14A and bent parts 14B each of which connects the straight parts 14A.

Figure 4A:
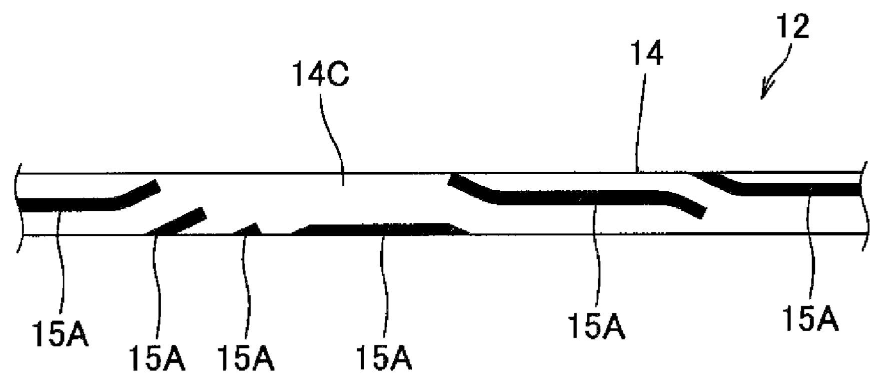
FIG. 4A is a side view which shows the exterior member before being processed.
Figure 4B:
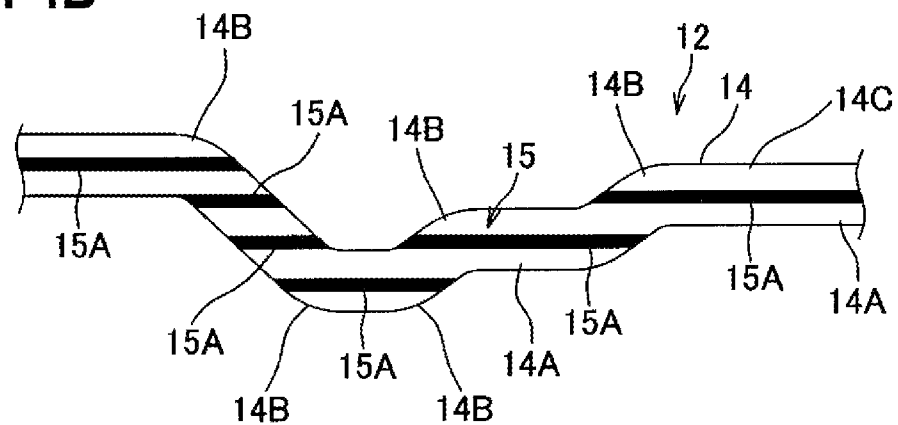
FIG. 4B is a side view which shows the exterior member after being processed.
Figure 5:
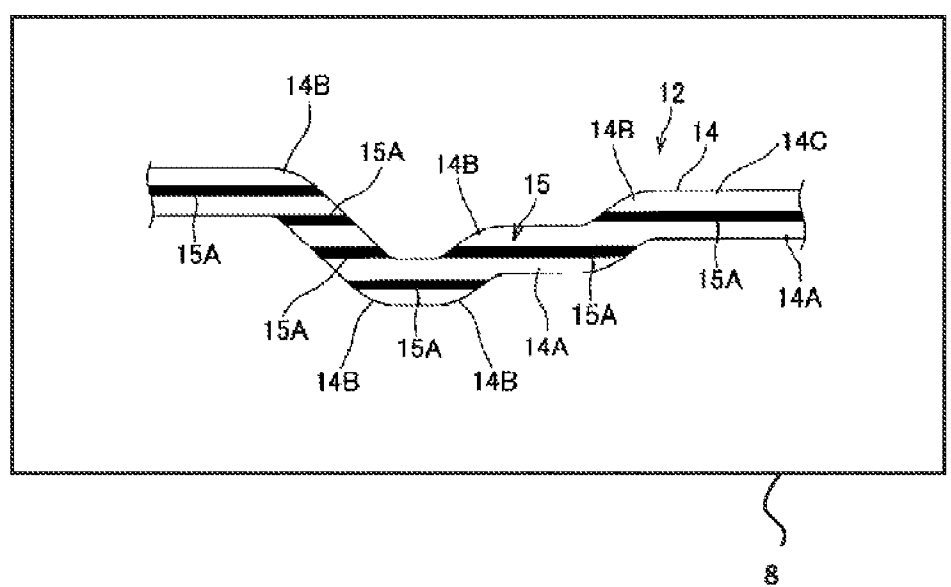
FIG. 5 is a figure showing the exterior member (12) supported by the floor (8) with the identifying mark (15) being provided to face a lower side thereof away from the floor (8).

The exterior member 12 has an identifying mark 15 which is provided on an outer surface 14C of the exterior member body 14. The identifying mark 15 has a predetermined identifying color which is different from the background color of the exterior member body 14, and as shown in FIG. 4B, is constructed to have a plurality of linear marks 15A which are provided in parallel with each other (namely a strip shape) on the exterior member 12 which is bent to have a three-dimensional shape. That is, as shown in FIG. 4A, the linear marks 15A are respectively arranged randomly at a glance on the exterior member body 14 before the exterior member body 14 is bent. On the other hand, when the exterior member body 14 is bent and supported by the floor 8, which is a supporting body, the linear marks 15A are provided along the same direction (for example, the longitudinal direction of the automobile 1), and are positioned at the lower side of the automobile 1 (that is, the other exposed side opposite to the floor 8).

For example, the linear marks 15A are colored to be orange as an identifying color to indicate that the electric wire 11 is a high voltage one. In addition, the identifying color is not limited to orange, but may be a color which is different from the background color of the exterior member body 14 and is visually recognizable. In addition, the linear marks 15A are not limited to a visually recognizable stripe shape, but may be drawn to be a prescribed shape while the exterior member 12 is attached to the floor 8, and may be provided at random. Furthermore, the identifying marks 15 are not limited to a plurality of linear marks 15A, but also may be constructed of a plurality of dots, and may be so constructed that the outer surface 14C of the exterior member body 14 facing the lower side of the automobile 1 is filled. That is, the identifying mark 15 is provided on the outer surface 14C at the side, which is exposed downward while the exterior member 12 is attached to the floor 8, to be visually recognizable, but is not provided on the outer surface 14C at the unexposed side which faces the floor 8 and is different to be visually recognized.

In a method of manufacturing the above exterior member 12, as shown in FIG. 4A, after the outer surface 14C of the straight exterior member body 14 is colored to have the identifying mark 15, the exterior member body 14 is bent at the plurality of bent parts 14B which are at middle positions in the longitudinal direction, and is bent to have a three-dimensional shape corresponding to the shape of the floor 8. Here, the position where the identifying mark 15 is added is set by calculating sites, which are opposite to the floor 8, of the exterior member body 14 which is bent to have the three-dimensional shape, and assigning (namely, reversely calculating) the calculated sites onto the straight exterior member body 14. In addition, other methods of coloring the identifying mark 15, for example, may be a method of coating paint having an identifying color on the outer surface 14C or a method of affixing a color tape having an identifying color onto the outer surface 14C.

According to the above embodiment, because the exterior member 12 is provided with the identifying mark 15 of an identifying color which is different from the background color of the exterior member body 14, the identifying mark 15 can be attached by being colored against the outer surface 14C regardless of the material of the exterior member body 14. In addition, while the exterior member 12 is supported by the floor 8, the identifying mark 15 is provided at the lower side (namely, the other exposed side). Thus, even if the exterior member body 14 is machined to have a three-dimensional shape having the bent parts 14B, the identifying mark 15 can be visually recognized from below, and the identifying property of the exterior member 12 can be improved by the identifying color of the identifying mark 15 whose visibility is ensured. Furthermore, because it is not necessary to provide the identifying mark 15 at the other side (namely the floor 8 side), the amount of coloring agent (for example, paint or color tape) to form the identifying mark can be decreased, and material cost can be suppressed.

The above described embodiment is only a representative embodiment of the invention, and the invention is not limited to the above embodiment. That is, various modifications can be made without departing from the spirit and scope of the invention.

For example, in the present embodiment, it is illustrated that the exterior member 12 is provided with the identifying mark 15 to identify that the electric wire 11, which is used as a high voltage electric power wire in a hybrid vehicle or an electric vehicle, is a high voltage one. However, the identifying mark is not limited to be used for identifying a high voltage electric wire, and may be used to identify any information such as purpose or type of an electric wire. In addition, in the embodiment, the exterior member 12 of the electric wire 11 wired below the floor 8 of the vehicle is provided with the identifying mark 15. However, the exterior member 12 is not limited to be used for the electric wire wired below the floor 8, but the wire harness 7 wired inside the engine room also may be coated by the exterior member 12 with the identifying mark 15, and it is possible to use the exterior member of the present invention for an electric wire wired at any other places.

The exterior member, electric wire wiring structure, and manufacture of the exterior member according to the embodiment will be summarized below.

(1) The exterior member 12 according to the embodiment covers the circumference of the electric wire 11 which is wired between electrical components (the inverter 4 and the junction block 6) along the electric wire 11, and is supported by a supporting body (the floor 8) while one side (a downward, exposed side) in a circumferential direction is exposed. The exterior member 12 includes the exterior member body 14 which is formed into a long cylindrical shape and which has a predetermined background color, and the identifying mark 15 which is provided on the outer surface 14C of the exterior member body 14 and which has another predetermined color (for example, orange) different from the background color. The exterior member body 14 is formed with at least one bent part 14B which is bent at a middle position in the longitudinal direction. The identifying mark 15 is provided to face the one side while the exterior member 12 is supported by the supporting body.

(2) The electric wire wiring structure 10 according to the embodiment includes the electric wire 11 which is wired in the longitudinal direction of the vehicle under the floor 8 of the vehicle (the automobile 1), and the exterior member 12 which covers the circumference of the electric wire 11 as described in (1). In the electric wire wiring structure 10, the exterior member 12 is supported by the floor 8 of the vehicle and is exposed downward, and the identifying mark 15 is provided to face the lower side while the exterior member 12 is supported by the floor 8 of the vehicle.

(3) In the method of manufacturing the exterior member according to the embodiment, after the identifying mark 15 is provided on the outer surface 14C of the exterior member body 14 of a straight shape, the exterior member body 14 is bent at a middle position in the longitudinal direction.

According to the exterior member, the electric wire wiring structure and the method of manufacturing the exterior member of the present invention, the present invention is useful in that the exterior member, the electric wire wiring structure, and the method of manufacturing the exterior member can be provided so that while the manufacturing cost can be controlled even for exterior members made of various materials, and an identifying mark whose identifying property is high is included.

What is claimed is:

1. An exterior member which covers the circumference of an electric wire, which is wired between electrical components, along the electric wire, and is supported by a supporting body, the exterior member comprising:

an exterior member body that is formed into a long cylindrical shape and which has a first background color; and an identifying mark that is provided on an outer surface of the exterior member body and which has a second color different from the background color, wherein the exterior member body is formed with at least one bent part which is bent at least at one end of a middle part of the exterior member in a longitudinal direction, and the identifying mark is provided to face away from the supporting body, wherein the identifying mark comprises linear marks arranged so that when the exterior member is formed with the at least one bent part, the linear marks are provided in parallel.

2. An electric wire wiring structure comprising:

an electric wire that is wired in the longitudinal direction of a vehicle under a floor of the vehicle; and the exterior member according to claim 1 that covers the circumference of the electric wire, wherein the exterior member is supported by the floor of the vehicle and is exposed downward, and the identifying mark is provided to face a lower side while the exterior member is supported by the floor of the vehicle.

3. The exterior member according to claim 1 wherein, the identifying mark is provided only on a portion of the outer surface of the exterior member body that faces away from the supporting body.

4. The exterior member according to claim 1, wherein the linear marks are not provided in parallel when the exterior member is not formed with the at least one bent part.

5. The exterior member according to claim 1, wherein the exterior member body is bent to have a shape corresponding to a shape of the supporting body, and wherein the identifying mark is arranged on the exterior member body based on the shape of the supporting body before the exterior member body is bent, so that the identifying mark is provided to face a lower side away from the supporting body after the exterior member body is bent.

* * * * *